US008510651B1

(12) United States Patent
Palkar et al.

(10) Patent No.: US 8,510,651 B1
(45) Date of Patent: Aug. 13, 2013

(54) PAGE EDITING AND TRIAL OF NETWORK SITE

(75) Inventors: Sukhada S. Palkar, Renton, WA (US);
Calvin D. Freitas, Seattle, WA (US);
John Santino, Bellevue, WA (US);
Olivier Z. Garamfalvi, Seattle, WA (US); Kaloyan K. Kraev, Seattle, WA (US); Kurtis J. Norwood, Seattle, WA (US)

(73) Assignee: Amazon Technologies, Inc, Reno, NV (US)

( * ) Notice: Subject to any disclaimer, the term of this patent is extended or adjusted under 35 U.S.C. 154(b) by 85 days.

(21) Appl. No.: 13/275,860

(22) Filed: Oct. 18, 2011

(51) Int. Cl.
*G06F 17/00* (2006.01)
(52) U.S. Cl.
USPC .......................................................... 715/273
(58) Field of Classification Search
USPC .......................................... 715/208, 243, 273
See application file for complete search history.

(56) References Cited

U.S. PATENT DOCUMENTS

| | | | | |
|---|---|---|---|---|
| 6,018,724 A | * | 1/2000 | Arent | 705/44 |
| 6,037,935 A | * | 3/2000 | Bates et al. | 715/760 |
| 6,253,193 B1 | * | 6/2001 | Ginter et al. | 705/57 |
| 6,453,306 B1 | * | 9/2002 | Quelene | 705/80 |
| 2001/0044787 A1 | * | 11/2001 | Shwartz et al. | 705/78 |
| 2002/0091582 A1 | * | 7/2002 | Palmer et al. | 705/26 |
| 2002/0152134 A1 | * | 10/2002 | McGlinn | 705/26 |
| 2004/0054555 A1 | * | 3/2004 | Piccionelli et al. | 705/1 |
| 2004/0189699 A1 | * | 9/2004 | Dobronsky | 345/751 |
| 2008/0065974 A1 | * | 3/2008 | Campbell | 715/200 |
| 2010/0306658 A1 | * | 12/2010 | Ariyoshi | 715/733 |
| 2011/0066658 A1 | * | 3/2011 | Rhoads et al. | 707/803 |
| 2011/0178851 A1 | * | 7/2011 | Tseng et al. | 705/7.38 |
| 2011/0191163 A1 | * | 8/2011 | Allaire et al. | 705/14.39 |

OTHER PUBLICATIONS

Nakamura, Masato, et al, "A Dynamic Rearrangement Mechanism of Web Page Layouts Using Web Agents", Dept. of Computer Science and Engineering, Graduate School of Engineering, Nagoya Institute of Technology, Japan, pp. 634-643, 2009.*

* cited by examiner

*Primary Examiner* — Laurie Ries
(74) *Attorney, Agent, or Firm* — Thomas|Horstemeyer, LLP

(57) ABSTRACT

Disclosed are various embodiments for facilitating a user to design and test a layout to a network merchant site. One embodiment of such a method describes presenting at a display device a graphical interface to edit a layout of a network page in at least one graphical pane; receiving a selection of parameters to a trial experiment of one or more modifications made to the layout of a version of the network page designed in the graphical pane(s); and tracking at least one metric for the version of the network page designed in the graphical pane(s) based on interactions with the first sample class of users.

21 Claims, 11 Drawing Sheets

Seller Central

Account ▼ | Messages | Help | Logout

Seller FAQ
Seller forums
* Amazon Announcements
* Seller Discussions
* Seller Support Blog

Manage Your Inventory
List single items
View your current inventory

Manage Your Orders
View your orders
Issue a refund for an order

Get Paid
View your payment accounts

Reports
View your performance summary
View your customer metrics summary
View your ratings and feedback

Settings
Seller account information
Notification preferences
Store settings
Site settings

Your Orders
In last day: 0
In last 7 days: 0
View your orders

Manage Your Case Log
View your case log

Feedback Rating
★★★★☆ 4 stars over seller's existence (532 ratings)

| Feedback | 30 days | 90 days | 365 days |
|---|---|---|---|
| Positive | - | - | - |
| Neutral | - | - | - |
| Negative | - | - | - |
| Count | 0 | 0 | 0 |

TOOLS ← SITE DESIGNER →

FIG. 4

Experiment is scheduled to terminate in 3 days

Terminate Early                    Extend Experiment

|  | Baseline | Test Case |
|---|---|---|
| Success | 82% | 90% |
| Failure | 15% | 9% |
| Abandon | 3% | 1% |

FIG. 8

PAGE EDITING AND TRIAL OF NETWORK SITE

BACKGROUND

In general, to create new layouts and user interfaces for an online retail environment, new web pages are manually designed, written, and deployed on a case by case basis.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 2 and 4-8 are drawings of user interfaces of various embodiments of the merchant site designer application of FIG. 1 according to various embodiments of the present disclosure.

DETAILED DESCRIPTION

The various embodiments described herein relate to systems and methods that facilitate design and testing of a layout to a network merchant site, such as a web site. Network pages within the web site include images, text elements, navigation controls, etc. Additionally, a network site designer uses a merchant site designer application to create or change a layout of page elements of the merchant site and to modify the properties of those elements. Accordingly, the designer may also configure parameters defining a trial environment under which the new layout may be tested and compared against an alternative layout for the web page. In the following discussion, a general description of the system and its components is provided, followed by a discussion of the operation of the same.

Figure 1:
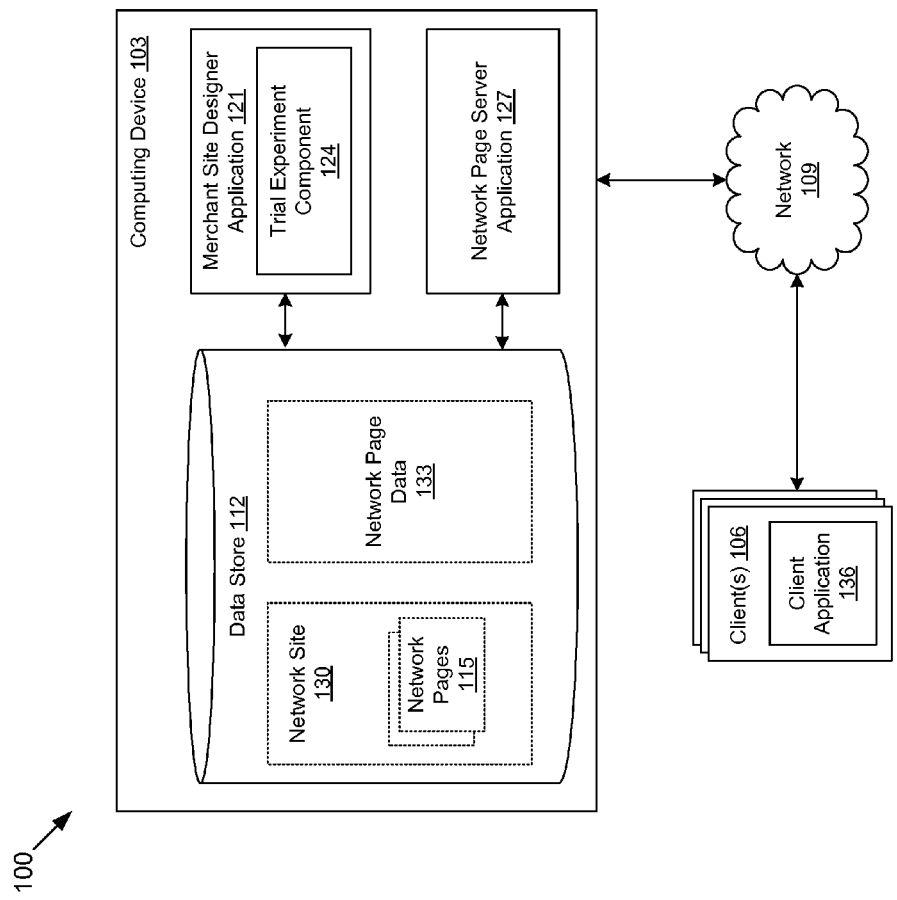
FIG. 1 is a drawing of a data communications network according to various embodiments of the present disclosure.

With reference to FIG. 1, shown is a networked environment 100 according to various embodiments. The networked environment 100 includes one or more computing devices 103 in data communication with one or more client devices 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112 includes data accessed by the components executing on the computing device 103, such as network pages 115, as well as potentially other data.

The components executed on the computing device 103 include, for example, a merchant site designer application 121, a trial experiment component 124, and a network page server application 127. The components executed on the computing device 103 may also include other applications, services, processes, systems, engines, or functionality not discussed in detail herein. These components may communicate with each other using various mechanisms, including but not limited to any type of middleware framework. Examples of such frameworks include remote procedure calls, simple object access protocol (SOAP), representational state transfer (REST), Windows Communication Foundation, and other frameworks. Though shown as logically separate components, the functionality of these components can be combined and/or distributed in various ways, as can be appreciated.

In some embodiments, the functionality of the trial experiment component 124 may be included in the merchant site designer application 121. In other embodiments, the trial experiment component 124 may be executed as a sub-module of the merchant site designer application 121, or as a separate, standalone application, etc.

A set of network pages 115 is arranged in a hierarchy to form a network site 130. The computing device 103 acts as a web hosting provider to host network sites 130 for various customers. To this end, the network page server application 127 is executed to receive requests for network pages 115 associated with one of the hosted network sites 130. These network page requests are generated by a client device 106 and received over the network 109. The network page server application 127 is further executed to generate a network page 115 corresponding to the network page request, i.e., a network page 115 associated with one of the hosted network sites 130. The network page server application 127 is further executed to serve up the generated network pages 115 in response to the network page requests.

The network pages fetched by the network page server application 127 may be dynamically generated or may be static. To this end, the network page server application 127 uses network page data 133, which may include any type of data related to the generation of network pages. Such data may include, for example, templates, executable code, interpreted code, hypertext markup language (HTML), extensible markup language (XML), images, video, text, graphics, and any other type of data that may be used in network pages. The network page server application 127 may comprise a hypertext transfer protocol (HTTP) server such as Apache® HTTP Server, Apache® Tomcat®, Microsoft® Internet Information Services (IIS), and/or any other type of network page server application.

The merchant site designer application 121 is executed to allow a user, such as a network site administrator or designer, to design or modify the network pages 115 that make up the network site 130. The merchant site designer application 121 makes use of the trial experiment component 124 which allows the network site designer to set up trial experimentation parameters on modifications made to page layout or content.

The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, or other devices with like capability.

The client device 106 may be configured to execute various client applications 136 such as a browser and other applications. The browser may be executed in a client device 106, for example, to access and render network pages, such as web pages, or other network content served up by the computing device 103. For example, the browser may be used to interact with the merchant site designer application 121. The client device 106 may be configured to execute applications 136 beyond browser such as, for example, email applications, instant message applications, and/or other applications.

Next, a general description of the operation of the various components of the networked environment 100 is provided. To begin, a user interacts with the merchant site designer application 121 to create new or modify preexisting network pages 115, where the pages may be part of a network site 130. A network page 115 can take the form of sections comprised of individual components, with each section capable of including a text element, an image or graphic element, or interface elements (such as buttons, menus, etc.). The user interacts with the merchant site designer application 121 to edit the text, image, hypertext link, and interface elements within a section or to make other modifications to the page or sections within the page. The user can also interact with the trial experiment component 124 to set up a trial experiment on modifications made to page layout or content for a newly modified page. As an example, the user can specify via trial experiment tools which elements are to be evaluated, which metrics are to be generated, and what visiting users or customers are to be subject to the experiment.

In some embodiments, the network site 130 operates as an electronic commerce marketplace. In such embodiments, a designer may design or modify network pages for customers to a retail environment or may design or modify network pages intended for sellers in the retail environment. In other embodiments, the network pages may be intended for a different environment and the merchant site designer application 121 may still be applicable.

In one embodiment, the merchant site designer application 121 presents a what-you-see-is-what-you-get (WYSIWYG) interface, so that changes to the layout of a network page 115 appear immediately within a layout view of the merchant site designer application 121. The merchant site designer application 121 generates layout code describing the network page 115. The layout code may include, for example, hypertext markup language (HTML), dynamic HTML, cascading style sheets (CSS), server side scripting, client side scripting, and other forms of layout code. The merchant site designer application 121 may validate the layout code to ensure that it conforms to one or more standards.

Figure 2:
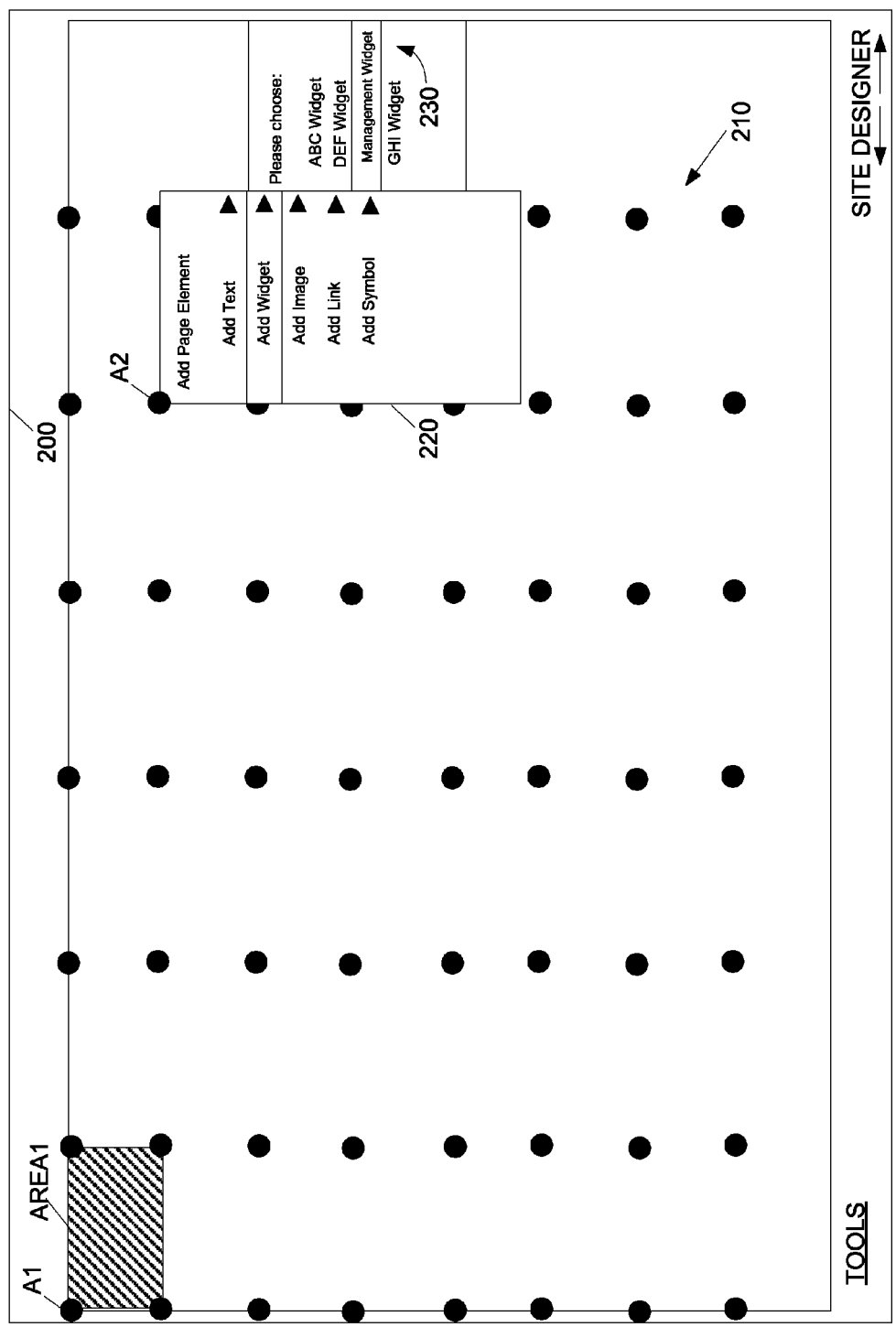

FIGS. 2 and 4-8 show user interface screens that can be generated by an embodiment of the merchant site designer application 121 (FIG. 1). In FIG. 2, the depicted user interface screen 200 can be rendered by a browser executing in a client device 106 (FIG. 1) in the networked environment 100 (FIG. 1) according to various embodiments of the present disclosure. Alternatively, the merchant site designer application 121 may be an installed application at the client 106 or may be installed at multiple computing devices including client 106 and computing device 103.

The user interface screen 200 includes a representation of a blank network page within the merchant site designer application 121 having a grid 210 of anchor points that can be selected and configured to add or edit page elements. The area to the bottom right of a selected anchor point is the area to which a page element may be added or modified. Accordingly, FIG. 2 shows anchor point A1 and the corresponding area AREA1 that is to the bottom right of the anchor point A1. In this area, a page element may be added by configuring the anchor point A1. Further, the area may be expanded to encompass surrounding areas by selecting an appropriate tool offered in the user interface, such as a resize option. Further, if a particular anchor point is configured to add a page element that requires more area than that immediately provided below and to the right of the anchor point, then the area may be automatically expanded to include surrounding areas not currently located with page elements, if possible. For example, in the figure, anchor point A2 is selected by a user (e.g., right clicking on the anchor point A2 using a mouse control) which causes a graphical menu 220 to be shown, whereby the user selects to add a widget interface from a list of possible choices. In this example, the user selects a management widget 230 from a list of possible widget choices.

Therefore, various embodiments of the merchant site designer application 121 allow for preloaded widgets to be used in designing a network page/site, such as widgets to add text or scripts, create custom menu bars, to add an image, to add specific categories of products, embed Flash files, etc. Accordingly, widgets may be dragged and dropped onto a representation of a network page to quickly enhance the appearance of the page. Further, via the user interface of the merchant site designer application 121, changes may be previewed before being published to a visiting user. Also, the merchant site designer application 121 can validate updates and changes to ensure that a modification complies with a syntax specified by a page language and can be rendered, as desired.

Figure 3:
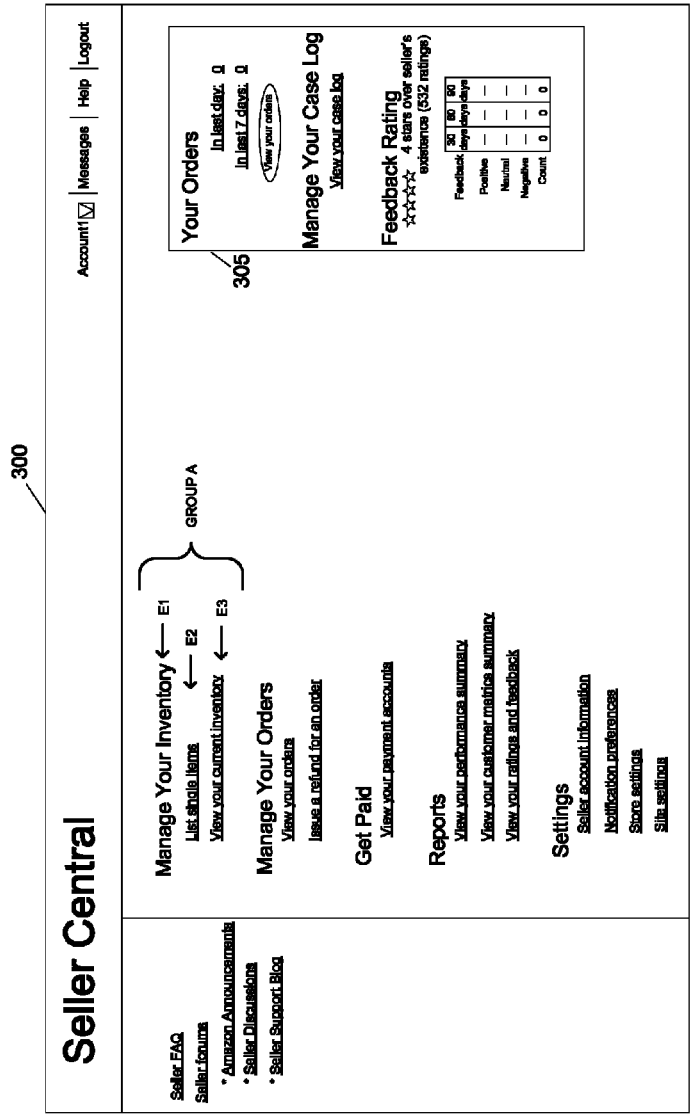
FIG. 3 is a diagram of a network page that is subject to being modified by the merchant site designer application of FIG. 1 according to various embodiments of the present disclosure.

In this fashion, a user may design a network page, such as the one shown in FIG. 3. In this network page 300, the management widget 305 has been added. In general, the network page 300, in this example, corresponds to a network page used by respective sellers to a retail environment to manage operation of their retail stores. While the network page 300 features individual page elements, such as E1, E2, E3, controls may be provided within the merchant site designer application 121 (FIG. 1) to select multiple elements and group them together as a single group of elements (e.g., Group A). Therefore, upon selecting an individual element in the group, the group of elements as a whole will be selected, and can be modified, moved, dragged, etc. collectively.

Referring now to FIG. 4, multiple groups of page elements can therefore be formed and represented in a user interface of the merchant site designer application 121 (FIG. 1). In this figure, the dashed boxes represent a group of elements that comprise one or more page elements. Accordingly, in the same way an anchor point can be selected, a group of page elements may be selected and a control may be executed to modify the group of page elements. Therefore, via the user interface, a selected group is configured to allow editing of page elements associated with the group. As an example, the order of elements can be rearranged in a group or the order of groups on the network page may be adjusted.

Therefore, using the merchant site designer application 121, a website or a network page can be modified inline. For example, a designer may click an anchor point or click on a preexisting page element and choose to add or replace the element with a predefined widget element or another page element, such as text block, image, link, etc.

Embodiments of the merchant site designer application 121 provide controls (e.g., by right clicking a mouse control or selecting from a tool area or bar in the user interface) to make changes to individual sections. For example, in one embodiment, the user can insert or change an image in a section or edit properties of an existing image. Similarly, in one embodiment, the user can insert or change text in a section or edit properties of existing text. Additionally, the user can insert or change a hyperlink in a section or edit the hyperlink, in one embodiment. Also, embodiments of the merchant site designer application 121 generate code which captures the layout of the network page 115 (FIG. 1) as modified by the merchant site designer application 121. In one embodiment, the user may view this code and view the layout, respectively.

Figure 5:
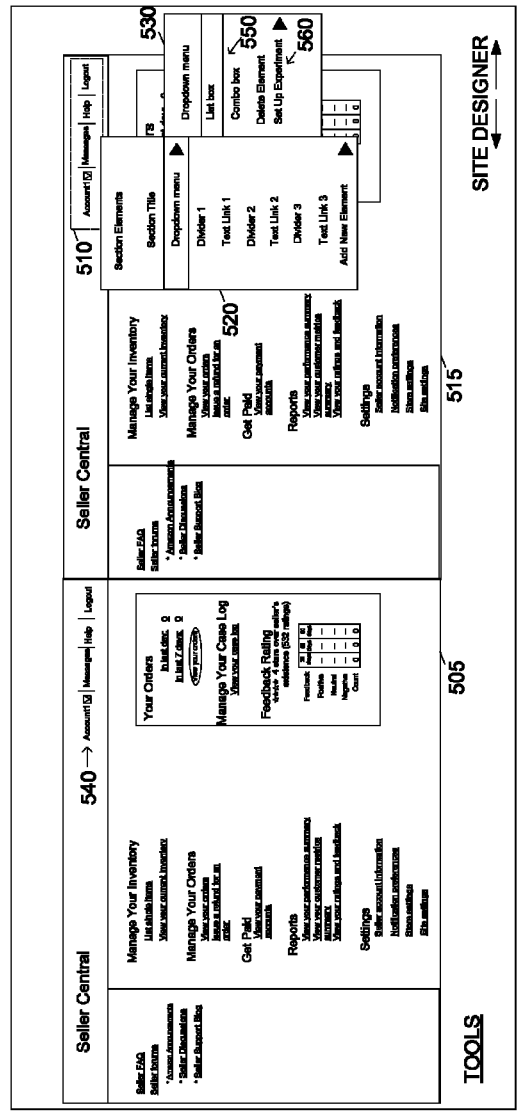

As stated above, the merchant site designer application 121 allows the designer to change a layout with an initial section configuration to another. Interface tools are also provided to select navigation or selection controls, in one embodiment. Referring now to FIG. 5, in a displayed network page, sections comprising an individual page element or group of page elements may be depicted. Therefore, a designer may select a particular section 510 (e.g., graphically clicking the particular section) which may cause an edit box 520 to popup for the section.

In one embodiment, the edit box 520 contains the page elements featured in the section, and selection of a particular page element causes a box 530 to be displayed with modifiable values or content for the element that can be edited or adjusted by the designer. Further, options may be provided for alternative representations of the element. For example, the present section of a network page may use a dropdown menu interface element and options may be provided to replace the dropdown menu element with another interface element, such as a list menu element or a combo box element. Also, ordering of tabs in a navigation control or toolbar may be capable of being changed or the designation of tabs may be capable of being modified. As an additional example, elements in one menu element may be moved to another menu element. The edit box may also provide a list of widgets that can be added, where a selected widget may be further configured in accordance with the designer's preferences. In general, a variety of graphical user interface elements may be offered to the designer via the merchant site designer application 121 (FIG. 1), such as buttons including check boxes and radio buttons, sliders, list boxes, spinners, drop-down lists, menus including context menus and pie menus, menu bars, toolbars, combo boxes (text boxes with attached menu or list box), icons, tree views, grid views, tab navigation controls, scrollbars, text boxes, labels, tooltips, balloons, status bars, progress bars, infobars, widgets, etc.

Various embodiments of the merchant site designer application 121 provide a capability (e.g., may have a button control) to split a screen into two (or more) panes where one pane shows a base or default view of a network page or site and the other pane shows an experiment view having a copy of the base/default view with access to the anchor points and/or sections that allow the designer to modify the layout of the page/site. Referring back to FIG. 5, an exemplary representation of a split screen interface provided by an embodiment of the merchant site designer application 121 (FIG. 1) is shown. The left side 505 of the screen depicts the base view of a network page and the right side 515 depicts an experiment view of the network page, where layout of the page may be changed by the designer under the experiment view. The experimental view provides for the designer to make alterations to the network page shown in the left pane and create a new version of the page in the right pane. This allows for the designer to see multiple user interfaces or network pages at the same time.

Consider the following illustrative example. Visiting users for a retail establishment may have multiple accounts, such as a seller account, a publisher account, a buyer account, etc. Accordingly, when the visiting user logs into a user interface using his or her seller account, then the visitor may be provided the seller portal referred here as "Seller Central." Otherwise, the visitor may log into the user interface with his or her publisher account and then be provided a publisher interface such as a tool for specifying content for a book (that is for sale) to be accessible by other visiting users in a preview mode. Also, a visiting user may have an account to a retail establishment in a role as a buyer.

In the base view 505 provided on the left, a dropdown menu interface control 540 is provided to allow the visiting user to switch between user accounts. In the experiment view on the right, this page element has been selected or more particularly, the group 510 containing this page element has been selected and a menu 520 is provided as a result from which one of the page elements in the group 510 can be highlighted. In this particular illustration, the dropdown menu has been selected and a second box 530 is provided with the dropdown menu choice and other possible menu choices. Here, the list box option 550 is selected to replace the dropdown menu in the experiment view 515.

Figure 6:
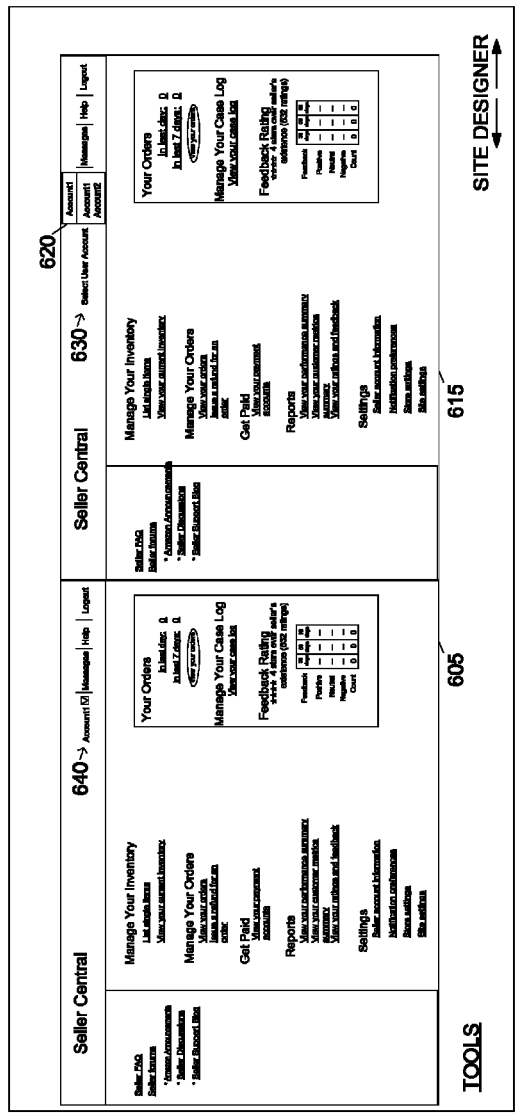

Accordingly, FIG. 6 shows a representation of the split screen with the base view 605 on the left (having the dropdown menu 640) and the experiment view on the right 615 (having the list box 620). With the list box 620, the multiple user accounts are visible at all time and in addition, text 630 has been added next to the box to "Select User Account." Whereas, on the base view 605, there is no explanatory text and it may not be readily apparent that the user can switch user accounts by clicking on the arrow that is part of the dropdown menu 640 causing a menu to drop down and allowing the user to toggle between user accounts. In this situation, it may be useful to implement a trial process to compare interactions with the two versions of the network page to see which one works better.

Embodiments of the merchant site designer application 121 (FIG. 1) allow the designer to specify a trial experiment for a modified page section or for the entirety of the page. After a user has defined a page layout, the designer can set up the trial experiment for the entire page or set up one or more trial experiments for individual sections. Using the merchant site designer application 121, new website features may be activated for a statistical sample of users, in one embodiment.

Figure 7:
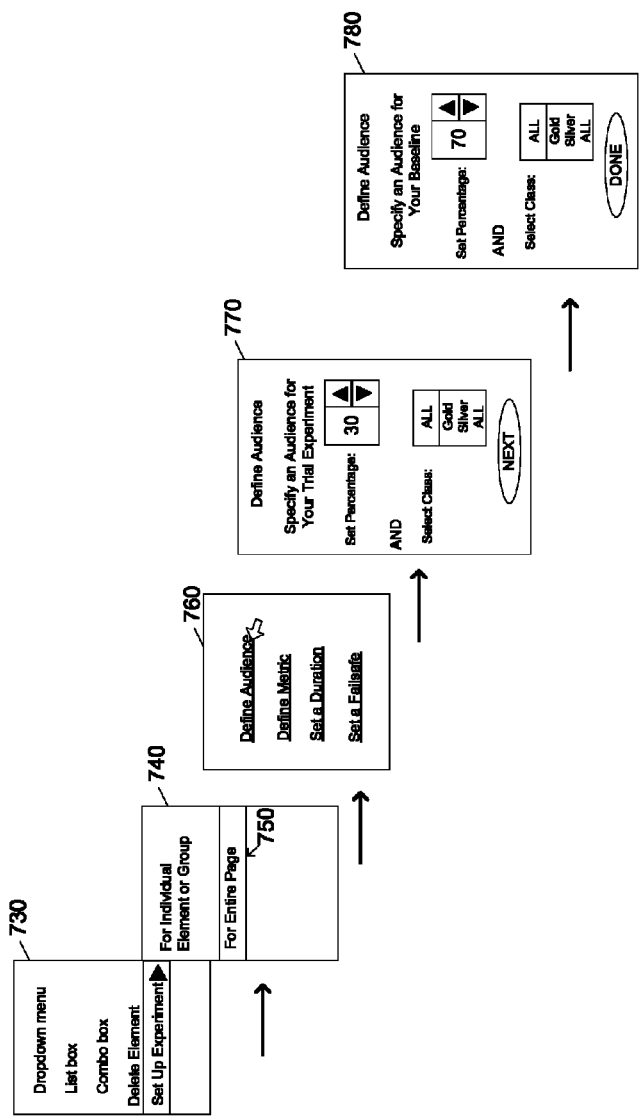

Referring now to FIGS. 5 and 7, exemplary user interface controls for setting up a trial experiment are shown. In FIG. 5, a menu 530 is provided that lists the option 560 to "Set Up Experiment," where this option was not selected in FIG. 5. However, with respect to FIG. 7, this menu 730 is illustrated (apart from underlying the user interface) and the option to "Set Up Experiment" is selected. In response to selecting the option, another menu 740 is launched which allows the designer to specify whether a trial experiment is to be set up for an individual element or group of elements or for the entire network page. Here, the option 750 to specify a trial experiment for the entire network page is selected. In response to this option, a dialog or popup box 760 may be presented with additional options that can be configured for the experiment being set up, including defining an audience for the experiment, defining a metric for evaluating the experiment, setting a failsafe, and setting a duration for the trial experiment.

Therefore, a user may set up the experiment to be provided to a particular set of visiting users and for the base/default view of the network page to be provided to a different set of visiting users. Thus, some people will get one version of the interface or page and other people will get a different version of the interface or page. As an example, an experiment view may be selected to be shown to 30% of visiting users in an interface box 770, whereby the remaining 70% can be selected to be shown the default network page, as demonstrated in interface box 780.

Also, in some embodiments, a user may specify nesting values for modified page elements. As an example, a user may specify that 10% of the total number of visiting users should view experimental page elements, whereby a new navigation control is set to be shown to 50% of the available visiting users and a new widget control is set to be shown to 60% of the available visiting users, where the available visiting users is 10% of the total visiting users. Embodiments of the merchant site designer application 121 (FIG. 1) may therefore allow the designer to see two different versions of a web page side by side and then also let the designer to assign which bucket or group of users see the modified page versus which users are actually going to get to see the default page. Further, various embodiments provide for multiple experimental views to be provided to a sample of visiting users. Accordingly, a first modified user interface or page may be provided to a first sample of users and a second modified user interface or page may be provided to a second sample of users. Also, the baseline or unmodified user interface or page may be provided to a third sample of users. By considering the results from different metrics or tests for each of the samples, it may be possible to identify characteristics or particular elements which tend to produce the top results.

In one embodiment, a repeating visiting user is maintained in the same class as in an earlier visit if the same trial experiment is ongoing. However, there may be exceptions. For example, a rule may be implemented specifying that a visiting user that is part of the sample class for the test or modified interface is not succeeding in the trial experiment, then the visitor may be moved out of the test class in a subsequent visit. Similarly, a rule may also be implemented specifying that a visitor that is part of the sample class for the baseline is not succeeding in the trial experiment, then the visitor may be moved out of the baseline sample class into the test class in a subsequent visit. Such rules may be set up to be enforced only in unique circumstances, since moving of users in and out of sample classes affect the statistical significance of trial experiment being conducted (although it may alleviate user frustrations).

In designating which visiting users are to access a test page or interface, in addition to specifying a percentage, one may also designate specific user-IDs or designate user groups or classes. As an example, within a retail environment, sellers may be grouped into different classes (e.g., individual sellers, home-based sellers, medium-sized businesses, large corporations, etc.) and may have names such as silver, gold, platinum, etc. Accordingly, a network page may be modified and targeted towards a segment of the gold sellers and compared against how another segment of the gold sellers (or some other class/group) performs with a default network page. Similarly, customers or buyers may be grouped into different classes of visiting users (e.g., casual users that buy a small amount of products, prime or preferred customers that buy a lot of products, select customers that buy a certain class of goods, such as groceries, etc.)

In addition to designating users for a trial experiment, the merchant site designer application 121 allows users to specify a metric to be used to track success of the experiment. For example, a uniform resource locator (URL) for a network page may be designated, whereby the merchant site designer application 121 can track how often the URL is requested responsive to visiting the default network page and the modified network page. Accordingly, a request for retrieval of a network page at the URL may signify a successful result. In one possible scenario, the network page may comprise an interface for a user to enter his or her shipping address. A successful completion of the shipping address will cause a confirmation page to be displayed at the user's web browser. An incomplete completion of the shipping address will cause an error notification message to be displayed. Therefore, the designer can configure the merchant site designer application 121 to track how often the confirmation page is served responsive to the network page comprising the interface being served.

Accordingly, the merchant site designer application 121 may provide an option to display a report or table of how the experiment is progressing or has progressed. FIG. 8 shows an exemplary illustration of such a report 810. For example, in a default or baseline layout of the interface, 82% of visiting users in a sample class may be found to have successfully completed the task. But on the other hand, for an experimental interface, the wording or other page element may have been changed and as a result, 90% of the visiting users in a sample class succeed in completing the task. Interestingly, both the experimental interface and the default interface may be implemented at the same time against a stream of users. Further, in some embodiments, more than one metric may be tracked. For example, the number of visiting users that cancel out of the interface and do not attempt to submit a shipping address could be tracked. Alternatively, as shown in the figure, a metric for visiting users that abandon the task is tracked. In the figure, 3% of visiting users of the default interface abandon the task and 1% of visiting users of the experimental interface abandon the task. The report interface 810 may show a current status of the experiment, such as an amount of time the experiment is set to run, and may include options to terminate the trial experiment upon command or to extend the timeline for the trial experiment.

In addition, one embodiment of the merchant site designer application 121 (FIG. 1) allows for a designer to set up or define how long the trial experiment is to be active. A designer can click on a date and time to start the experiment, can specify a length of time to run the experiment, and/or specify an end date for the trial experiment. Alternatively, a designer may specify that the experiment is to be deactivated after a total number of hits or visitors access the experiment. Therefore, an experiment may be set to end in accordance with a time limit or a quantity limit. Also, in some embodiments, a failsafe can be set to deactivate a trial experiment upon occurrence of a specified condition. For example, a designer may specify the condition to be a metric that tracks that the experiment falls below 20% of the default or baseline after a designated length of time. In this situation, the experiment is deactivated and all visiting users will be directed to the default network page. Conversely, in some embodiments, a rule can be set to continue a trial experiment passed a scheduled expiration date when a metric for the experiment succeeds or performs better than a designated threshold value.

In some embodiments, certain features of the merchant site designer application 121 may be exposed to classes of visiting users, such as sellers. Therefore, a seller may modify a layout of network pages representing the seller's store and set up a trial experiment to test the modified layout. Similarly, aspects of the merchant site designer application 121 may be exposed to other users in different environments besides the retail context.

Additionally, before publishing or exposing a modified layout to visiting users, embodiments of the merchant site designer application 121 integrate an approval system where another entity is to approve publication and/or testing of a modified interface/page by a respective designer. Therefore, a list of approvers for a particular interface/page may be configured, where after a designer configures a trial experiment, one or more approvers from the list are needed to approve the trial experiment (via an interface of the merchant site designer application 121) before the experiment is placed in production.

Figure 9:
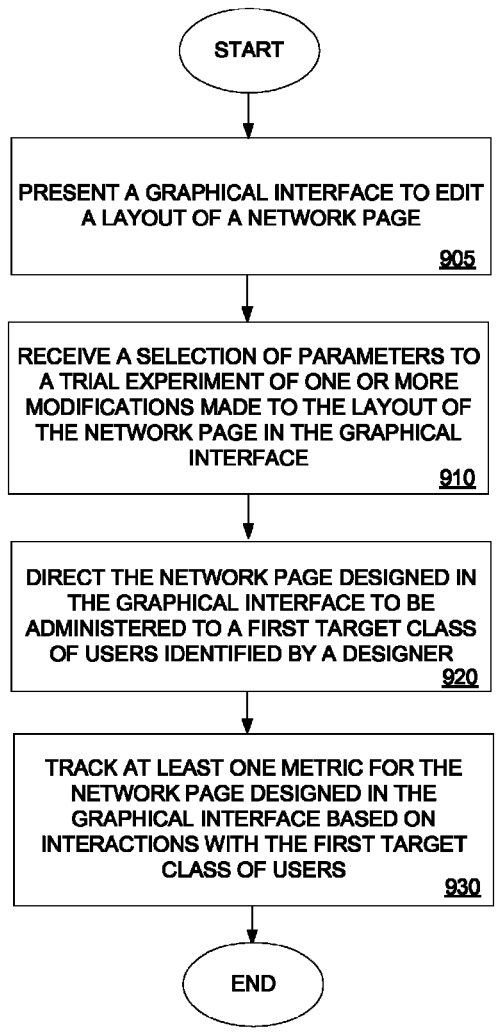
FIGS. 9-10 are flowcharts illustrating various examples of functionality implemented as portions of a merchant site designer application executed in a computing device in the data communications network of FIG. 1 according to various embodiments of the present disclosure.

Referring next to FIG. 9, shown is a flowchart that provides one example of the operation of a portion of the merchant site designer application 121 (FIG. 1) according to various embodiments. It is understood that the flowchart of FIG. 9 provides merely an example of the many different types of functional arrangements that may be employed to implement the operation of the portion of the merchant site designer application 121 as described herein. As an alternative, the flowchart of FIG. 9 may be viewed as depicting an example of steps of a method implemented in the computing device 103 (FIG. 1) according to one or more embodiments.

Beginning with box 905, the merchant site designer application 121 presents a graphical interface to edit a layout of a network page and, in box 910, the merchant site designer application 121 receives a selection of parameters to a trial experiment of one or more modifications made to the layout of the network page in the graphical interface. Next, in box 920, the merchant site designer application 121 directs the network page designed in the graphical interface to be administered to a first target or sample class of users identified by a designer (e.g., a user operating the merchant site designer application 121). Therefore, in box 930, the merchant site designer application 121 tracks at least one metric for the network page designed in the graphical interface based on interactions with the first target or sample class of users.

Figure 10:
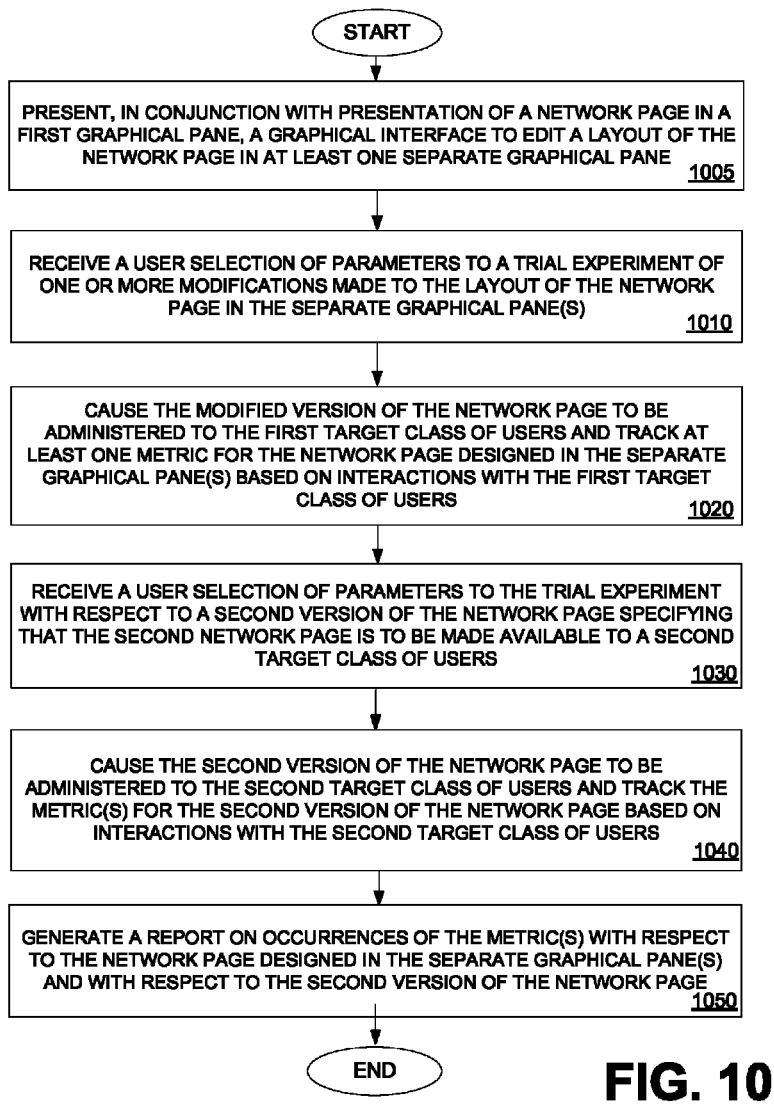

Turning now to FIG. 10, shown is another example of the operation of a portion of the merchant site designer application 121 (FIG. 1) according to various embodiments. Beginning with box 1005, the merchant site designer application 121 (FIG. 1) presents, in conjunction with presentation of a network page in a first graphical pane, a graphical interface to edit a layout of the network page in at least one separate graphical pane. Next, in box 1010, the merchant site designer application 121 receives a user selection of parameters to a trial experiment of one or more modifications made to the layout of the network page in the separate graphical pane(s). In particular, the trial experiment specifies that the network page designed in the separate graphical pane(s) is available to a first target or sample class of users. Therefore, in box 1020, the merchant site designer application 121 causes a modified version of the network page to be administered to the first target class of users and tracks at least one metric for the network page designed in the separate graphical pane(s) based on interactions with the first target class of users. In box 1030, the merchant site designer application 121 receives a user selection of parameters to the trial experiment with respect to a second version of the network page (e.g., an unmodified version or a different modified version) specifying that the second version of the network page is to be made available to a second target class of users (which is mutually exclusive from the first target class). As a result, the merchant site designer application 121 causes the second version of the network page to be administered to the second target class of users and tracks the metric(s) for the second version of the network page based on interactions with the second target class of users, in box 1040. Then, in box 1050, the merchant site designer application 121 generates a report on occurrences of the metric(s) with respect to the network page designed in the separate graphical pane(s) and with respect to the second version of the network page.

Figure 11:
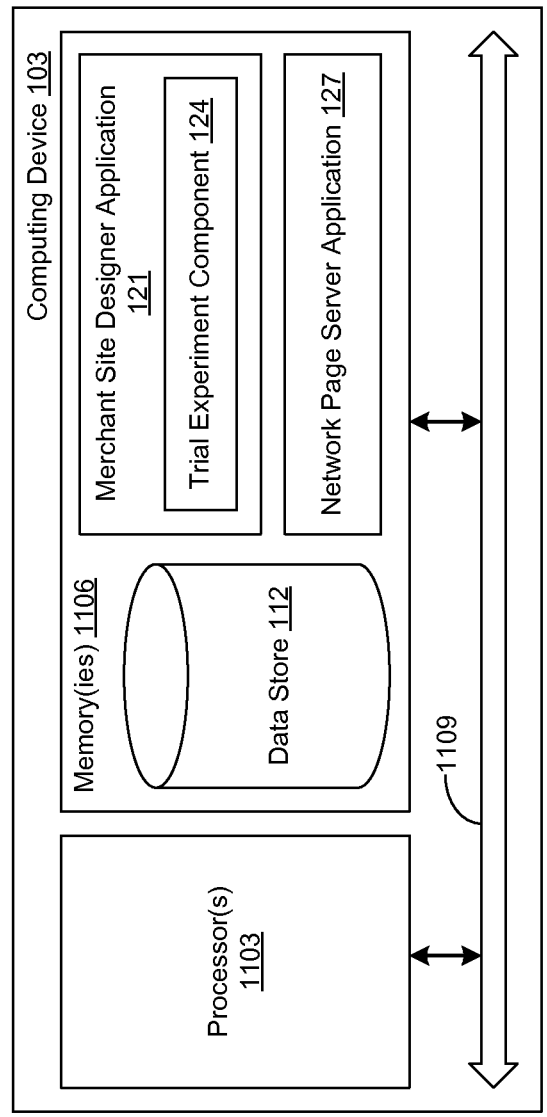
FIG. 11 is a schematic block diagram that provides one example illustration of a computing device employed in the data communications network of FIG. 1 according to various embodiments of the present disclosure.

Moving on to FIG. 11, shown is a schematic block diagram of the computing device 103 according to an embodiment of the present disclosure. The computing device 103 includes at least one processor circuit, for example, having a processor 1103 and a memory 1106, both of which are coupled to a local interface 1109. To this end, the computing device 103 may comprise, for example, at least one server computer or like device. The local interface 1109 may comprise, for example, a data bus with an accompanying address/control bus or other bus structure as can be appreciated.

Stored in the memory 1106 are both data and several components that are executable by the processor 1103. In particular, stored in the memory 1106 and executable by the processor 1103 are the merchant site designer application 121, the trial experiment component 124, the network page server application 127, and potentially other applications. Also stored in the memory 1106 may be a data store 112 and other data. In addition, an operating system may be stored in the memory 1106 and executable by the processor 1103. While not illustrated, the client device 106 also includes components like those shown in FIG. 11, whereby the browser 136 is stored in a memory and executable by a processor.

It is understood that there may be other applications that are stored in the memory 1106 and are executable by the processor 1103 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 1106 and are executable by the processor 1103. In this respect, the term "executable" means a program file that is in a form that can ultimately be run by the processor 1103. Examples of executable programs may be, for example, a compiled program that can be translated into machine code in a format that can be loaded into a random access portion of the memory 1106 and run by the processor 1103, source code that may be expressed in proper format such as object code that is capable of being loaded into a random access portion of the memory 1106 and executed by the processor 1103, or source code that may be interpreted by another executable program to generate instructions in a random access portion of the memory 1106 to be executed by the processor 1103, etc. An executable program may be stored in any portion or component of the memory 1106 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1106 is defined herein as including both volatile and nonvolatile memory and data storage components. Volatile components are those that do not retain data values upon loss of power. Nonvolatile components are those that retain data upon a loss of power. Thus, the memory 1106 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1103 may represent multiple processors and the memory 1106 may represent multiple memories that operate in parallel processing circuits, respectively. In such a case, the local interface 1109 may be an appropriate network 109 (FIG. 1) that facilitates communication between any two of the multiple processors 1103, between any processor 1103 and any of the memories 1106, or between any two of the memories 1106, etc. The local interface 1109 may comprise additional systems designed to coordinate this communication, including, for example, performing load balancing. The processor 1103 may be of electrical or of some other available construction.

Although the merchant site designer application 121 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 9 and 10 show the functionality and operation of an implementation of portions of the merchant site designer application 121 (FIG. 1). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1103 (FIG. 11) in a computer system or other system. The machine code may be converted from the source code, etc. If embodied in hardware, each block may represent a circuit or a number of interconnected circuits to implement the specified logical function(s).

Although the flowcharts of FIGS. 9 and 10 show a specific order of execution, it is understood that the order of execution may differ from that which is depicted. For example, the order of execution of two or more blocks may be scrambled relative to the order shown. Also, two or more blocks shown in succession in FIGS. 9 and 10 may be executed concurrently or with partial concurrence. Further, in some embodiments, one or more of the blocks shown in FIGS. 9 and 10 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the merchant site designer application 121 (FIG. 1), that comprises software or code can be embodied in any non-transitory computer-readable medium for use by or in connection with an instruction execution system such as, for example, a processor 1103 (FIG. 11) in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:

code that presents, in conjunction with presentation of a network page in a first graphical pane, a graphical interface to edit a layout of the network page in at least one separate graphical pane;

code that enables user-specification of at least one page element of a version of the network page designed in the graphical interface to be evaluated as part of a trial experiment;

code that enables user-specification of at least one metric to be generated responsive to interactions with at least one version of the network page, the at least one version of the network page including the version of the network page designed in the graphical interface; and code that enables user-specification of at least one sample class of visiting users requesting access to the network page that is to be subject to the trial experiment;

code that receives a user-selection of parameters to the trial experiment of the at least one version of the network page in the at least one separate graphical pane, wherein in the trial experiment, the version of the network page designed in the at least one separate graphical pane is administered to a first sample class of users, wherein the parameters to the trial experiment comprise at least one of a date to initiate the trial experiment, a date to terminate the trial experiment, a percentage of visiting users to assign to the at least one sample class of visiting users; a designation of a class of visiting users to assign to the at least one sample class of visiting users; and a designation of a failsafe that automatically terminates the trial experiment; and code that tracks the at least one metric for the at least one version of the network page designed in the at least one separate graphical pane based on interactions with the at least one sample class of visiting users.

2. The computer-readable medium of claim 1, further comprising:

code that administers access to an unmodified version of the network page to a second sample class of visiting users and administers access to the version of the network page designed in the at least one separate graphical pane to the first sample class of visiting users mutually exclusive from the second sample class of visiting users;

code that tracks the at least one metric for the unmodified version of the network page based on interactions with the second sample class of visiting users; and code that reports on occurrences of the at least one metric with respect to the version of the network page designed in the at least one separate graphical pane and with respect to the unmodified version of the network page.

3. The computer-readable medium of claim 1, wherein terms of the failsafe designate the experiment to automatically terminate when a metric being tracked for the trial experiment is below a designated value after a designated length of time.

4. A system, comprising:

at least one computing device; and a network site designer system executable in the at least one computing device, the network site designer system comprising:

logic that presents a graphical interface to edit a layout of a network page;

logic that receives a designer selection of parameters to a trial experiment of one or more modifications made to the layout of the network page in the graphical interface, wherein the trial experiment administers a version of the network page designed in the graphical interface available to a first sample class of visiting users identified by a designer; and logic that tracks at least one metric for the version of the network page designed in the graphical interface based on interactions with the first sample class of visiting users.

5. The system of claim 4, the network site designer system further comprising:

logic that administers access to an unmodified version of the network page to a second sample class of visiting users mutually exclusive from the first sample class;

logic that tracks the at least one metric for the unmodified version of the network page based on interactions with the second sample class of visiting users; and logic that reports on occurrences of the at least one metric with respect to the version of the network page designed in the graphical interface and with respect to the unmodified version of the network page.

6. The system of claim 4, wherein the parameters to the trial experiment comprise at least one of a date to initiate the trial experiment, a date to terminate the trial experiment, a percentage of visiting users to assign to the first sample class of visiting users; a designation of a class of visiting users to assign to the first sample class of visiting users; and a designation of a failsafe that automatically terminates the trial experiment.

7. The system of claim 4, the network site designer system further comprising:

logic that enables designer-specification of at least one page element of the version of the network page designed in the graphical interface to be evaluated as part of the trial experiment;

logic that enables designer-specification of the at least one metric to be generated responsive to interactions with at least one version of the network page, the at least one version of the network page including the version of the network page designed in the graphical interface; and logic that enables designer-specification of at least one sample class of visiting users requesting access to the network page that is to be subject to a trial experiment.

8. The system of claim 4, the network site designer system further comprising:

logic that receives a designer-indication of a location point in the network page to add at least one page element;

logic that presents a list of page elements available to be inserted at the location point; and logic that inserts a particular page element selected by the designer from the list at the location point.

9. The system of claim 4, the network site designer system further comprising:

logic that enables the designer to set terms for a failsafe for the trial experiment, occurrence of which will automatically terminate the trial experiment.

10. The system of claim 9, wherein the terms for the failsafe designate the trial experiment to terminate when a metric being tracked for the trial experiment is below a designated value after a designated length of time.

11. The system of claim 9, wherein the terms for the failsafe designate the trial experiment to terminate when a metric being tracked for the trial experiment is above a designated value after a designated length of time.

12. The system of claim 4, the network site designer system further comprising:

logic that enables the designer to set a duration period for the trial experiment, wherein the version of the network page that is designed is automatically discontinued from being administered after the duration period expires.

13. The system of claim 4, the network site designer system further comprising:

logic that enables the designer to set a duration period for the trial experiment, wherein the version of the network page that is designed is automatically continued to be administered after the duration period expires.

14. The system of claim 4, the network site designer system further comprising:

logic that receives a designer-indication of at least one page element in the network page to be edited;

logic that presents a list of page elements available to replace the at least one page element; and logic that inserts at least one new page element selected by the designer from the list in place of the at least one page element.

15. The system of claim 4, the network site designer system further comprising:

logic that modifies a property of a page element in accordance with designer-instruction, the page element comprising one of a graphic element, text element, and a hyperlink element.

16. A method, comprising the steps of:

encoding, by at least one computing device, for presenting at a display device a graphical interface to edit a layout of a network page in at least one graphical pane;

receiving, by the at least one computing device, a selection of parameters to a trial experiment of one or more modifications made to the layout of a version of the network page designed in the at least one graphical pane, wherein, for the trial experiment, the version of the network page designed in the at least one graphical pane is administered to a first sample class of users identified by a designer; and tracking, by the at least one computing device, at least one metric for the version of the network page designed in the at least one graphical pane based on interactions with the first sample class of users.

17. The method of claim 16, further comprising:

administering access to an unmodified version of the network page to a second sample class of users mutually exclusive from the first sample class of users;

tracking the at least one metric for the unmodified version of the network page based on interactions with the second sample class of users; and reporting on occurrences of the at least one metric with respect to the version of the network page designed in the at least one graphical pane and with respect to the unmodified network page.

18. The method of claim 16, further comprising receiving a selection of parameters to the trial experiment of the one or more modifications made to the layout of the network page in the graphical interface, wherein the parameters to the trial experiment comprise at least one of a date to initiate the trial experiment, a date to terminate the trial experiment, a percentage of users to assign to the first sample class of users; a designation of a class of users to assign to the first sample class of users; and a designation of a failsafe that automatically terminates the trial experiment.

19. The method of claim 16, further comprising receiving specification of at least one page element of the version of the network page designed in the graphical interface to be evaluated as part of the trial experiment;

prompting for specification of the at least one metric to be generated responsive to interactions with at least one version of the network page; and prompting for specification of at least one sample class of users requesting access to the network page that is to be subject to the trial experiment.

20. The method of claim 16, further comprising:

receiving an indication of at least one page element in the network page to be edited;

presenting a list of page elements available to replace the at least one page element; and inserting at least one new page element selected by the designer from the list in place of the at least one page element.

21. The method of claim 16, further comprising:

receiving failsafe terms for the trial experiment, wherein occurrence of an event specified in the failsafe terms automatically terminates the trial experiment.

* * * * *